United States Patent
Faruque et al.

(10) Patent No.: US 11,713,014 B1
(45) Date of Patent: Aug. 1, 2023

(54) INFLATABLE PET ENCLOSURE

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/747,355

(22) Filed: May 18, 2022

(51) Int. Cl.
| | |
|---|---|
| *B60R 21/207* | (2006.01) |
| *B60R 21/2165* | (2011.01) |
| *B60R 21/015* | (2006.01) |
| *B60R 21/231* | (2011.01) |
| *B60R 21/2338* | (2011.01) |
| *B60R 21/264* | (2006.01) |
| *B60R 21/16* | (2006.01) |

(52) U.S. Cl.
CPC ...... *B60R 21/207* (2013.01); *B60R 21/01512* (2014.10); *B60R 21/2165* (2013.01); *B60R 21/2338* (2013.01); *B60R 21/23138* (2013.01); *B60R 21/264* (2013.01); *B60R 2021/162* (2013.01); *B60R 2021/23107* (2013.01)

(58) Field of Classification Search
CPC ............ B60R 21/207; B60R 21/01512; B60R 21/2165
See application file for complete search history.

(56) References Cited

U.S. PATENT DOCUMENTS

| | | | |
|---|---|---|---|
| 6,296,292 B1 | 10/2001 | Feldman | |
| 8,104,429 B2 * | 1/2012 | Bennett | A01K 1/0272 119/28.5 |
| 9,226,473 B2 | 1/2016 | Hoffman | |
| 10,023,146 B2 | 7/2018 | Faruque et al. | |
| 11,040,691 B2 * | 6/2021 | Faruque | B60R 21/2338 |
| 11,066,033 B2 | 7/2021 | Goswami | |
| 11,325,554 B1 * | 5/2022 | Faruque | B60R 21/01512 |

* cited by examiner

*Primary Examiner* — Faye M Fleming
(74) *Attorney, Agent, or Firm* — Frank A. MacKenzie; Bejin Bieneman PLC (57) ABSTRACT

An assembly for a vehicle includes a seat having a seatback and a seat bottom. The seat bottom has a front end spaced from the seatback. The assembly includes a front airbag elongated along the front end of the seat bottom. A first side airbag is elongated in a direction from the seatback to the front end. A second side airbag is elongated in a direction from the seatback to the front end. The second side airbag is spaced cross-seat from the first side airbag. The assembly includes a controller. The controller is programmed to inflate the first side airbag and the second side airbag in response to at least detection of a vehicle impact. The controller is programmed to selectively inflate the front airbag in response to at least detection of the vehicle impact and detection of a non-human animal occupant on the seat.

19 Claims, 9 Drawing Sheets

INFLATABLE PET ENCLOSURE

BACKGROUND

Pet owners may choose to travel with their pet. For example, the pet owner may travel with their pet in a vehicle, allowing the pet to sit unrestrained in the vehicle. This may allow the pet to wander about the vehicle and to interact with the pet owner while the vehicle is being operated. However, when the pet is unrestrained in the vehicle, the pet's kinematics during a vehicle impact are uncontrolled.

DETAILED DESCRIPTION

An assembly for a vehicle includes a seat having a seatback and a seat bottom. The seat bottom has a front end spaced from the seatback. The assembly includes a front airbag elongated along the front end of the seat bottom. A first side airbag is elongated in a direction from the seatback to the front end. A second side airbag is elongated in a direction from the seatback to the front end. The second side airbag is spaced cross-seat from the first side airbag. The assembly includes a controller. The controller is programmed to inflate the first side airbag and the second side airbag in response to at least detection of a vehicle impact. The controller is programmed to selectively inflate the front airbag in response to at least detection of the vehicle impact and detection of a non-human animal occupant on the seat.

The controller is programmed to inflate the first side airbag and the second side airbag in response to the occupant being a human occupant.

The seatback may include a top, the front airbag in the inflated position extending upwardly from the seat bottom to the top of the seatback.

The seat may include a first bolster and a second bolster, the first side airbag abutting the first bolster in the inflated position and the second side airbag abutting the second bolster in the inflated position.

The assembly may include a tether having a first end connected to the front airbag and a second end connected to the seatback.

The assembly may include a retractor assembly supported on the seatback, the second end connected to the retractor assembly.

The retractor assembly may include a guide roller supported on the seatback and a pyrotechnic actuator supported on the seatback.

The guide roller may be operatively engaged with the first tether when the pyrotechnic actuator retracts the first tether.

The seat bottom may include a tear seam, the tether being positioned under the tear seam in the uninflated position.

The seat may include an occupant seating area having a first side and a second side, the first tether being disposed adjacent the first side or the second side.

The front airbag may include a first end and a second end, the tether assembly including a second tether, the first tether being connected to the first end and the second tether being connected to the second end.

The assembly may include an occupant type sensor, the occupant type sensor detecting whether the occupant of the seat is a non-human animal occupant or a human occupant.

An assembly for a vehicle comprises a seat having a seat bottom, the seat bottom having a first section and a second section; a first airbag assembly supported on the first section of the seat bottom and a second airbag assembly supported on the second section of the seat bottom, the first airbag assembly and the second airbag assembly inflatable to an inflated position; and a controller programmed to inflate the first airbag assembly or the second airbag assembly in response to a detected vehicle impact and detected occupancy of a non-human animal occupant on the first section or the second section.

The first airbag assembly and the second airbag assembly may inflate upwardly from the seat bottom to the inflated position.

The controller may be programmed to inflate the first airbag assembly and the second airbag assembly independently.

The first portion is about 60% of the seat bottom and the second portion is about 40% of the seat bottom.

The first airbag assembly and the second airbag assembly may each include a front airbag, a first side airbag, and a second side airbag.

The controller may be programmed to inflate the first side airbag and the second side airbag in response to at least detection of a vehicle impact; and selectively inflate the front airbag in response to at least detection of the vehicle impact and detection of a non-human animal occupant on the seat.

The assembly may include an occupant type sensor, the occupant type sensor detecting whether the occupant of the seat is a non-human animal occupant or a human occupant.

With reference to the Figures, wherein like numerals indicate like parts throughout the several views, a vehicle 10 is generally shown. An assembly 12 for the vehicle 10 includes a seat 14 having a seatback 16 and a seat bottom 18. The seat bottom 18 has a front end 18c spaced from the seatback 16. The assembly 12 includes a front airbag 20 elongated along the front end 18c of the seat bottom 18. A first side airbag 22 is elongated in a direction from the seatback 16 to the front end 18c. A second side airbag 24 is elongated in a direction from the seatback 16 to the front end 18c. The second side airbag 24 is spaced cross-seat from the first side airbag 22. The assembly 12 includes a controller 26. The controller 26 is programmed to inflate the first side airbag 22 and the second side airbag 24 in response to at least detection of a vehicle impact. The controller 26 is programmed to selectively inflate the front airbag 20 in response to at least detection of the vehicle impact and detection of a non-human animal occupant 28a on the seat 14.

The seat 14 may be occupied by, for example, a human occupant 28b or the non-human animal occupant 28a. During vehicle impact the airbags, i.e., the front airbag 20, the first side airbag 22, and the second side airbag 24, control the kinematics of the occupant. Because the controller 26 is programmed to selectively inflate the front airbag 20 in response to detection of the non-human animal occupant 28a on the seat 14, the assembly 12 can be used for both human occupants 28b and non-human animal occupants 28a. In other words, in response to detection of a vehicle impact the first side airbag 22 and the second side airbag 24 will inflate. In examples where the occupant is a human occupant 28b, the first side airbag 22 and the second side airbag 24 will control the kinematics of the human occupant 28b. In examples where the occupant is a non-human animal occupant 28a, the front airbag 20 will also inflate. In such examples, the front airbag 20, the first side airbag 22, and the second side airbag 24 will control the kinematics of the non-human animal occupant 28a.

The vehicle 10 may be any type of passenger or commercial automobile such as a car, a truck, a sport utility vehicle, a crossover, a van, a minivan, a taxi, a bus, etc. The vehicle 10, for example, may be operated by a driver and/or may be an autonomous vehicle in which the vehicle 10 is autonomously operated such that the vehicle 10 may be driven without constant attention from a driver, i.e., the vehicle may be self-driving without human input.

The vehicle 10 includes a body defining a passenger cabin (not numbered) to house occupants, if any, of the vehicle 10. The body may include a roof (not numbered) and a floor 30 with the roof defining an upper boundary of the passenger cabin and the floor 30 defining a lower boundary of the passenger cabin. The body includes doors openable to allow ingress to and egress from the passenger cabin.

The passenger cabin may extend across the vehicle 10, i.e., from one side 32a to the other side 32b of the vehicle 10. The passenger cabin includes a front end (not numbered) and a rear end (not numbered) with the front end being in front of the rear end during forward movement of the vehicle 10.

The vehicle 10 includes one or more seats 14 in the passenger cabin. The seats 14 may be arranged in any suitable arrangement. For example, one or more of the seats 14 may be at the front end of the passenger cabin, i.e., a front seat 14a, and/or one or more of the seats may be at the rear end of the passenger cabin, i.e., a rear seat 14b. The rear seats 14b may be in a second row of seats, as shown in Figure. As another example, the rear seats 14b may be in a third row of seats. As shown in the Figures, the rear seat 14b may extend in the across the passenger cabin, e.g., from one side 32a to the other side 32b of the vehicle 10. The rear seat 14b defines the cross-seat axis C and a vertical axis V transverse to the cross-seat axis C, as identified in FIG. 1.

Figure 1A:
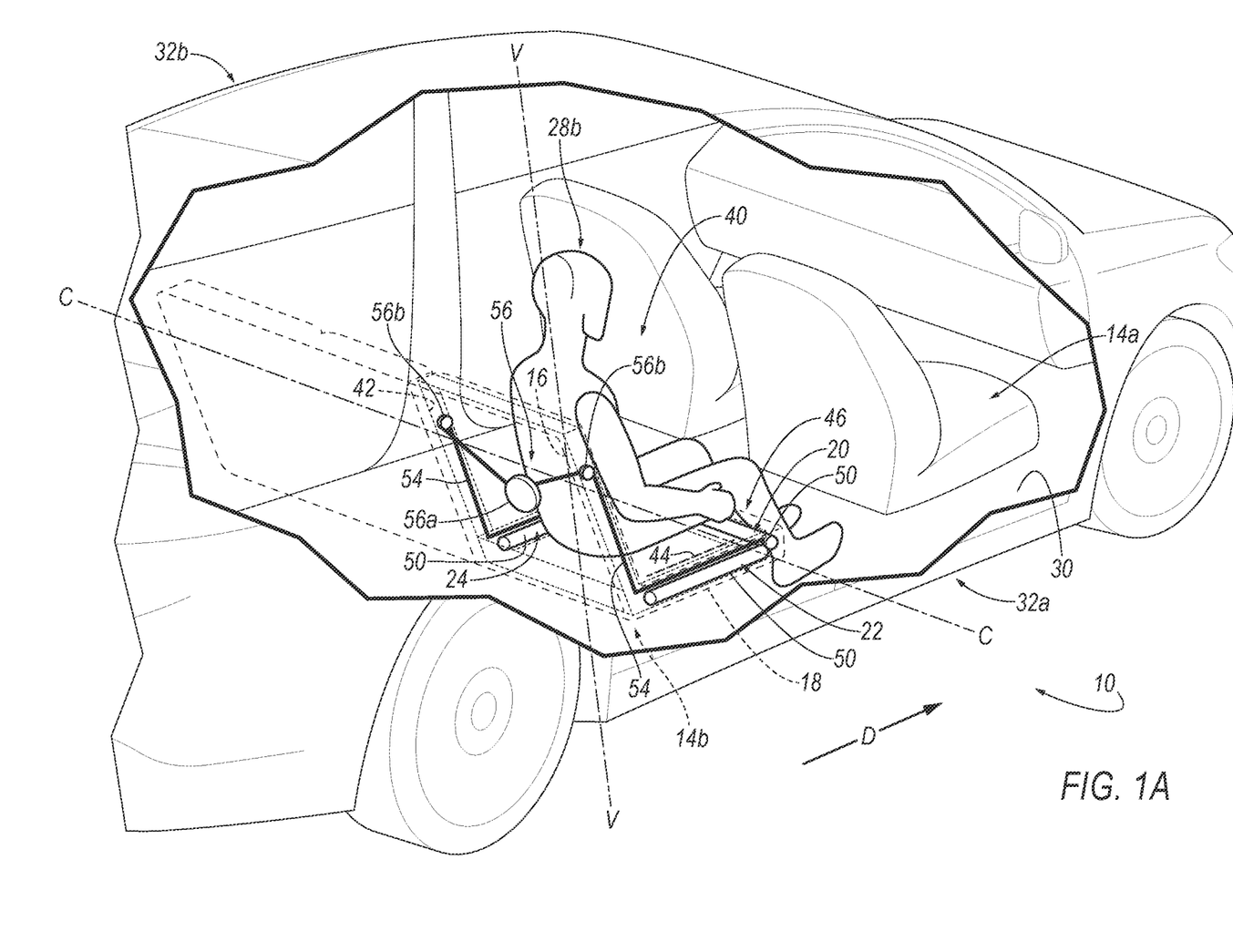
FIG. 1A is a perspective view of a vehicle and an airbag assembly with a human occupant.

Each seat 14 is supported by the floor 30, as identified in FIG. 1A. Each seat 14 may be selectively slideable relative to the floor 30, e.g., in the seat-forward direction D or a seat-backward direction. In such an example, the seat 14 may be supported on a seat track (not shown) to allow the seat 14 to move in the seat-forward direction D or the seat-backward direction. The seat 14 may be selectively slidable relative to the seat track. In other words, the occupant may slide the seat 14 along the seat track and may secure the seat 14 to the seat track at selected position. For example, the occupant may actuate a motor (not shown) that moves the seat 14 along the seat track. As another example, each seat 14 may be fixed relative to the floor 30, i.e., immovable relative to the floor 30.

The rear seats 14b may be any suitable type, e.g., bench seats, bucket seats, etc. As shown in the Figures, the rear seat 14b is a bench seat. In the example shown in FIGS. 1A-3B, the rear seat 14b is a bench seat. In the example shown in FIG. 4, the rear seat 14b is a bench seat, and more specifically a 60/40 split bench seat. In examples where the rear seat 14b is the 60/40 split bench seat, the seatback 16 may have a long segment 16a and a short segment 16b independently foldable relative to the seat bottom 18. Specifically, the long segment 16a and the short segment 16b may be independently foldable vehicle-forward and downwardly toward the floor 30 to a folded position. The short segment 16b is approximately 40% of the length of the seatback 16 along a cross-seat axis C and the second section is approximately 60% of the length of the seatback 16 along the cross-seat axis C. The seat bottom 18 has a long portion 18a and a short portion 18b that correspond to the long segment 16a and the short segment 16b of the seatback 16. In other words, the long portion 18a of the seat bottom 18 is about 60% of the length seat bottom 18 along the cross-seat axis C and the short portion 18b of the seat bottom 18 is about 40% of the length of the seat bottom 18 along the cross-seat axis C. The long portion 18a and the short portion 18b of the seat bottom 18 may be unitary, i.e., the seat bottom 18 may extend continuously along the cross-seat axis C. In other examples, the seatback 16 may be unitary, i.e., the seatback 16 may extend continuously along the cross-seat axis C or may have any suitable percentage split. In the examples shown in 1A-2B, the seatback 16 may be either split or continuous.

The seatback 16 may be supported by the seat bottom 18 and may be stationary or movable relative to the seat bottom 18. For example, as described above, the seatback 16 may rotatable relative to the seat bottom 18 to a folded position. The seatback 16 and the seat bottom 18 may be adjustable in multiple degrees of freedom. Specifically, the seatback 16 and the seat bottom 18 may themselves be adjustable, in other words, adjustable components within the seatback 16 and/or the seat bottom 18 may be adjustable relative to each other.

The seat bottom 18 includes the front end 18c and a back end 18d. The seatback 16 is at the back end 18d of the seat bottom 18. The front end 18c of the seat bottom 18 is spaced from the back end 18d of the seat bottom 18 and the seatback 16. The seatback 16 extends across the seat bottom 18, e.g., from one side of the seat 14 to the other side of the seat 14, at the back end 18d of the seat bottom 18.

The seat bottom 18 includes a top 18e and a bottom 18f spaced from the top 18e and the seatback 16 along the vertical axis V. For example, the top 18e of the seat bottom 18 may be adjacent to the seatback 16, and the bottom 18f of the seat bottom 18 may be adjacent to the floor 30.

The seatback 16 includes a bottom 16f at the seat bottom 18 and a top 16e spaced from the bottom 16f and the seat bottom 18 along the vertical axis V of the seat 14. Specifically, in an upright position, the seatback 16 is elongated upwardly from the seat bottom 18 on or along the vertical axis V of the seat 14, i.e., including parallel to the vertical axis V or angled relative to the vertical axis V. The top 16e may support a head restraint (not numbered), i.e., be disposed between the head restraint and the seat bottom 18.

The seat 14 includes a first bolster 34a and a second bolster 34b. Specifically, the seatback 16 includes the first bolster 34a and the second bolster 34b. The first bolster 34a is disposed on a first side 36a of the seat 14 and the second bolster 34b is disposed on a second side 36b of the seat 14.

The seat 14 defines a seat-forward direction D, as identified in FIG. 1. The seat-forward direction D extends forward relative to the seat 14. Specifically, the seat-forward direction D extends from a rear 38b of the seat 14 to a front 38a of the seat 14 relative to an occupant of the seat 14, i.e., the occupant of the seat 14 faces in the seat-forward direction D. The seat bottom 18 extends from the seatback 16 in the seat-forward direction D.

The seat 14 defines an occupant seating area 40. The occupant seating area 40 is the area occupied by an occupant, e.g., a non-human animal or a human, when seated on the seat bottom 18. The occupant seating area 40 may have a first side 40a and a second side 40b. The occupant is positioned between the first side 40a of the occupant seating area 40 and the second side 40b of the occupant seating area 40 when the occupant is seated on the seat bottom 18. The occupant seating area 40 is in the seat-forward direction D of the seatback 16 and above the seat bottom 18. That is, the seatback 16 and the top 18e of the seat bottom 18 face the occupant seating area 40. The occupant seating area 40 for the rear seat 14b may be between the front seat 14a and the seatback 16 of the rear seat 14b.

In the example shown in the figures, the non-human animal occupant 28a is a dog. The non-human animal occupant 28a may be any non-human animal typically kept as a pet. Specifically, the non-human animal occupant 28a may be any suitable domesticated animal that can fit on the rear seat 14b, e.g., a dog, a cat, a rabbit, a small pig, etc.

The seat 14 includes a seat frame 42. The seat frame 42 may include panels 52 and/or may include tubes, beams, etc. The seat frame 42 may be formed of any suitable plastic material, e.g., carbon fiber reinforced plastic (CFRP), glass fiber-reinforced semi-finished thermoplastic composite (organosheet), etc. Alternatively, for example, some or all components of the seat frame 42 may be formed of a suitable metal, e.g., steel or aluminum.

The seat 14 includes a covering (not numbered) supported on the seat frame 42. The covering may be cloth, leather, faux leather, or any other suitable material. The seat 14 may include padding material between the covering and the seat frame 42. The padding material may be foam or any other suitable material. The covering may be stitched in panels 52 around the seat frame 42 and padding material.

The seat 14, e.g., the covering, may include at least one tear seam 42 on the seat bottom 18. At least one tear seam 42 may extend along the front end 18c of the seat bottom 18 adjacent to the airbag. The front airbag 20 may extend through the tear seam 42 in the inflated position. At least one tear seam 42 may extend from the back end 18d of the seat bottom 18 toward the front end 18c of the seat bottom 18. The first side airbag 22 and/or the second side airbag 24 may extend through the tear seam 42 in the inflated position. The seat 14 may include at least one tear seam 42 on the seatback 16 and/or the seat bottom 18 aligned with, for example, tethers disposed under the covering. The tear seam 42 may have any suitable shape.

The tear seam 42 is designed to tear apart when subjected to a tensile force above a threshold magnitude, specifically, force generated by inflation of the airbag and/or deployment of the tether. In other words, the covering on one side of the tear seam 42 separates from the covering on the other side of the tear seam 42 when the force is above the threshold magnitude. The threshold magnitude may be chosen to be greater than forces from, e.g., inadvertent pushing against the seat 14 by an occupant but be less than forces from the deployment of the airbag. The tear seam 42 may be, for example, a line of perforations through the covering, a line of thinner covering material than the rest of the covering, etc.

The vehicle 10 may include an infant seat attachment system, e.g., a Lower Anchors and Tethers for Children (LATCH) system. The infant seat attachment system may include one or more anchor brackets each attached to one of the seat 14 or a component of the vehicle 10 adjacent to the seat 14, e.g., the body. The pet may wear a harness that is releasably connected to the anchor brackets of the infant seat attachment system, e.g., via one or more attachments configured to attach the harness to the vehicle 10, as shown in the Figures. As an example, the attachment may be a tether fixed to the harness and attachable to one anchor bracket on the rear seat 14b b, e.g., via a clip, hook, etc. In other examples, the pet may be able to move between the first section and the second section of the rear seat 14b. In such examples, the pet may or may not be wearing the harness.

The vehicle 10 includes at least one airbag assembly 46. In the example shown in FIGS. 1A-2B, one airbag assembly 46 is shown. In the example shown in FIGS. 3A-3B, two airbag assemblies 46a, 46b are shown. Common numerals are used to identify common features of the airbag assemblies. In the example shown in FIGS. 3A-3B, one of the airbag assemblies 46b is along the long segment 16a of the seatback 16 and is longer along the cross-seat axis C than the other airbag assembly 46a, which is along the short segment 16b of the seatback 16. Specifically, the vehicle 10 may include a first airbag assembly 46a and a second airbag assembly 46b, each inflatable to an inflated position. The first airbag assembly 46a is supported on the short portion 18b of the seat bottom 18 and the second airbag assembly 46b supported on the long portion 18a of the seat bottom 18.

The airbag assembly 46 includes the front airbag 20, the first side airbag 22, the second side airbag 24. At least one inflator 48 inflates the front airbag 20, the first side airbag 22, and the second side airbag 24, as described below. The inflator 48 may be a component of the airbag assembly 46. In examples in which the vehicle 10 includes more than one airbag assembly 46, the airbag assemblies may share a single inflator 48. The airbag assembly 46 may include a housing 50, as described further below.

The seat 14 supports the airbag assembly 46, and specifically, may support each of the front airbag 20, the first side airbag 22, and the second side airbag 24 in the inflated position. The airbag assembly 46 may be mounted to the seat 14, as discussed further below.

Figure 1B:
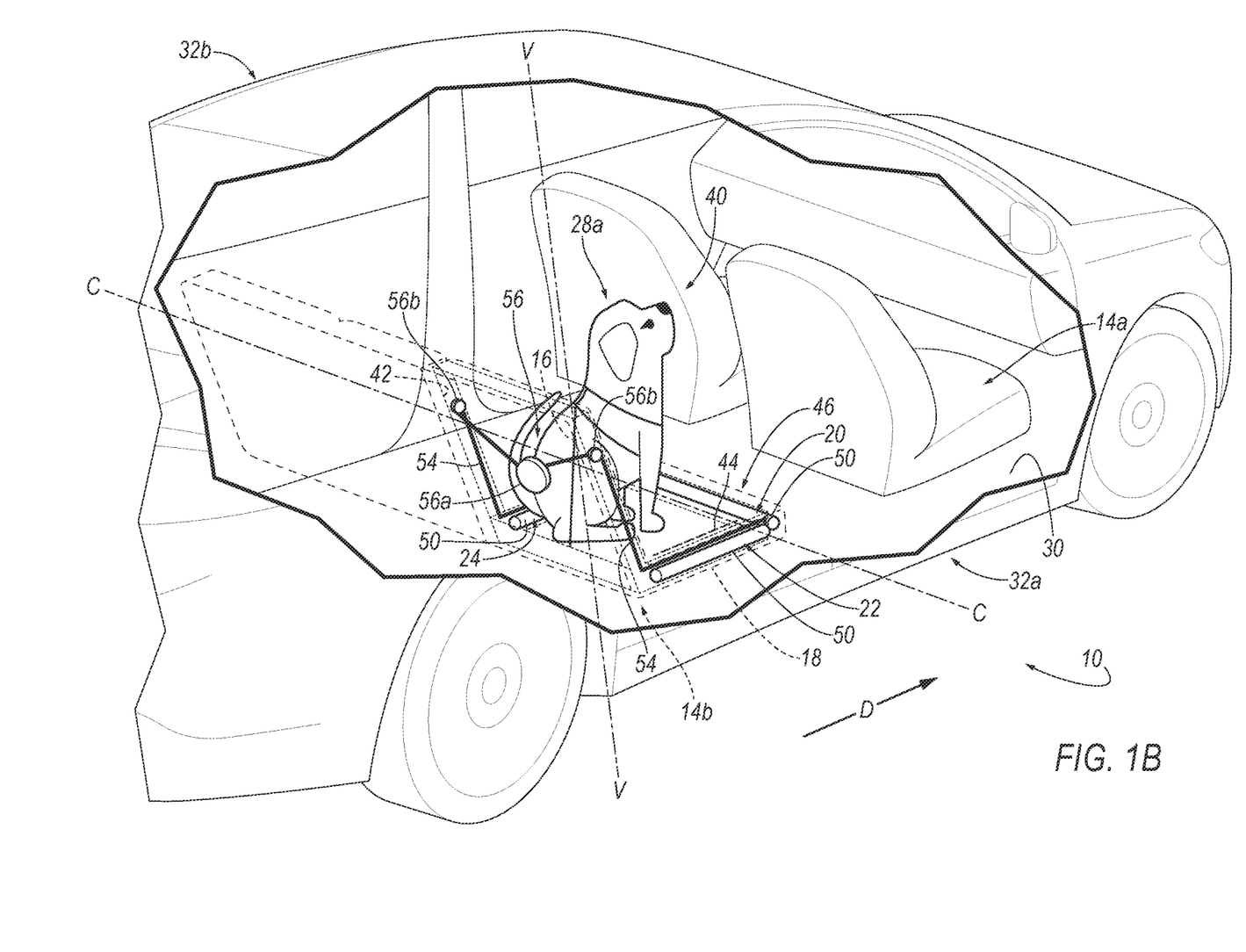
FIG. 1B is a perspective view of the vehicle and the airbag assembly with a non-human animal occupant.
Figure 2A:
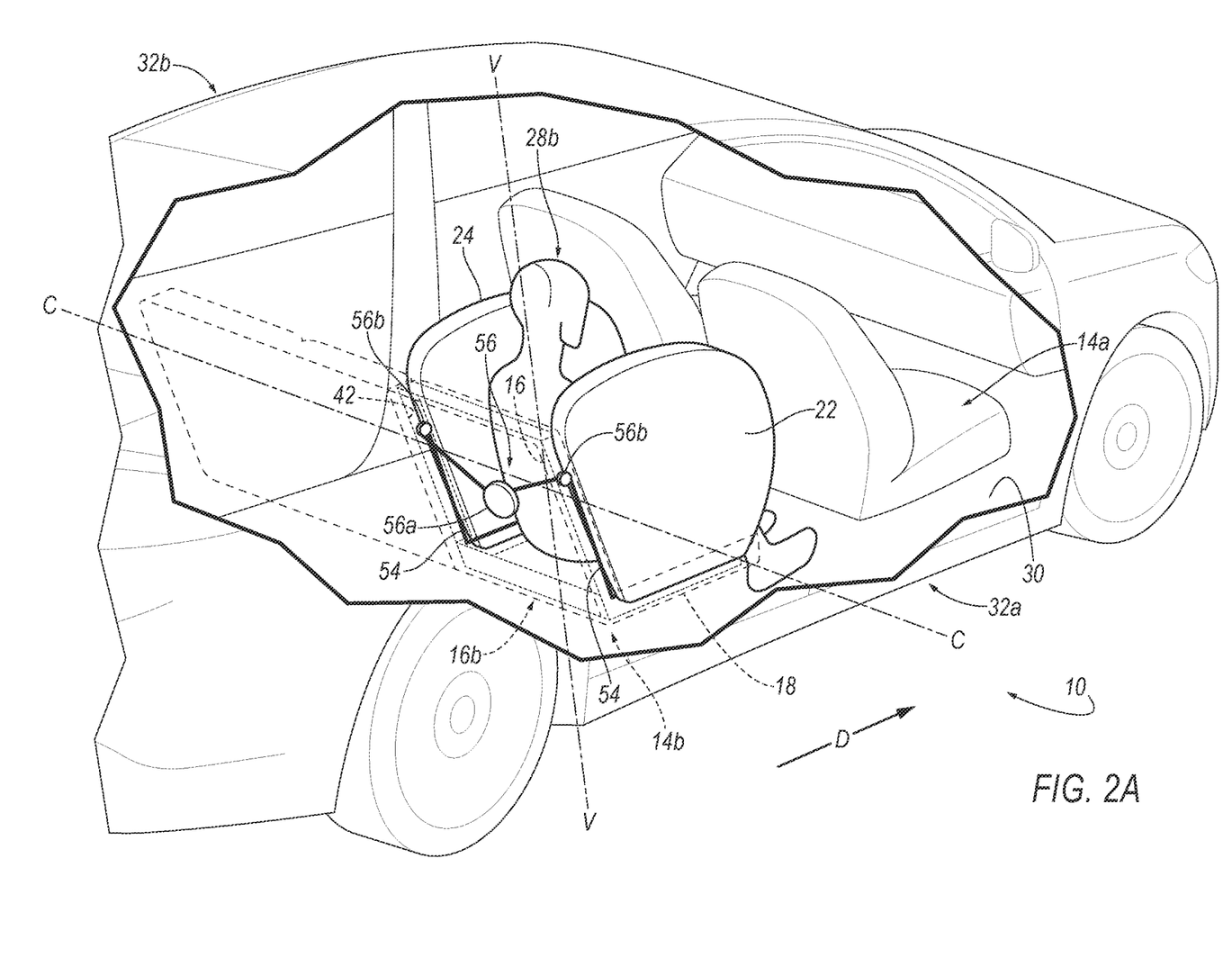
FIG. 2A is a perspective view of the vehicle and the airbag assembly in the inflated position with the human occupant.
Figure 2B:
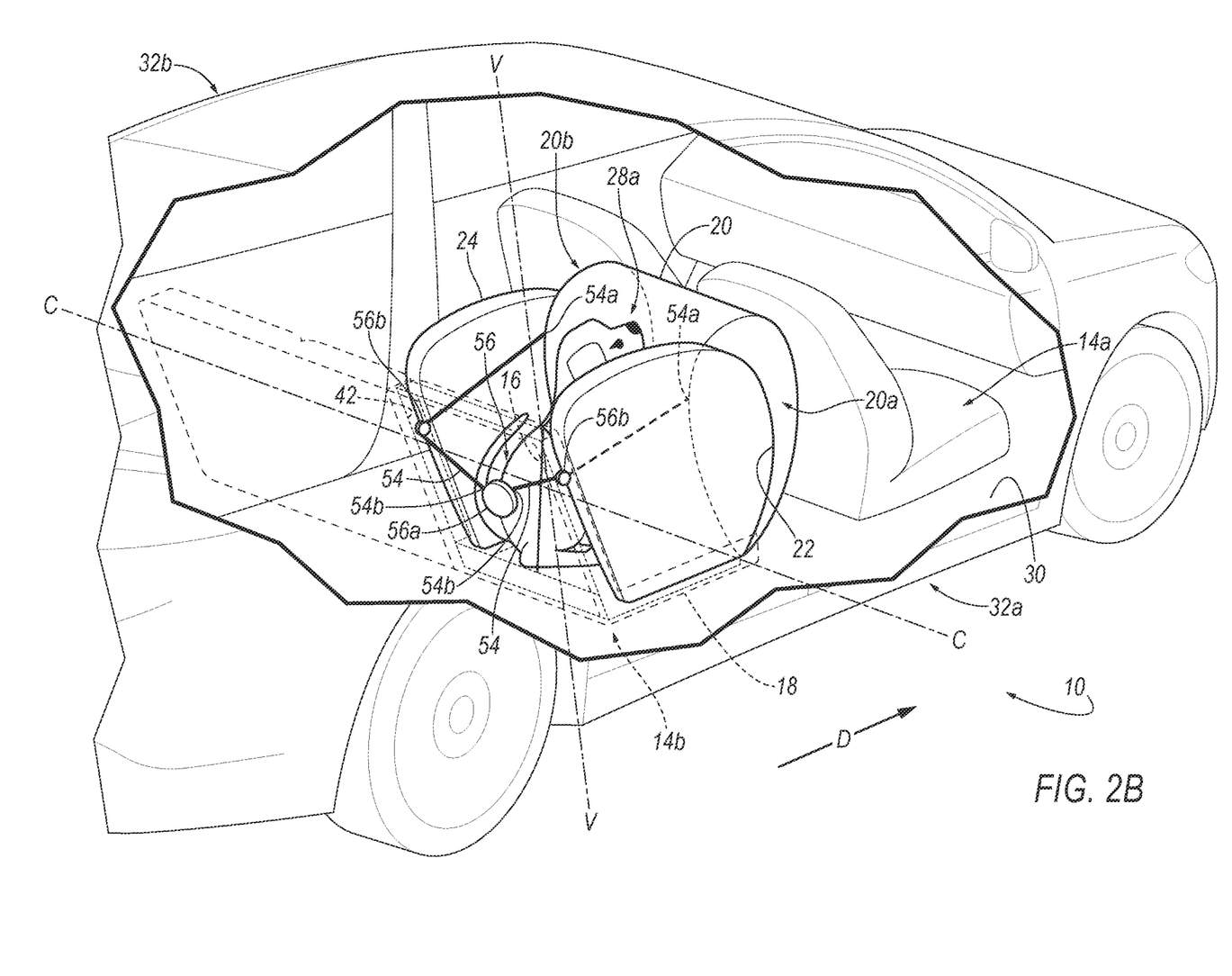
FIG. 2B is a perspective view of the vehicle and the airbag assembly in the inflated position with the non-human animal occupant.
Figure 3A:
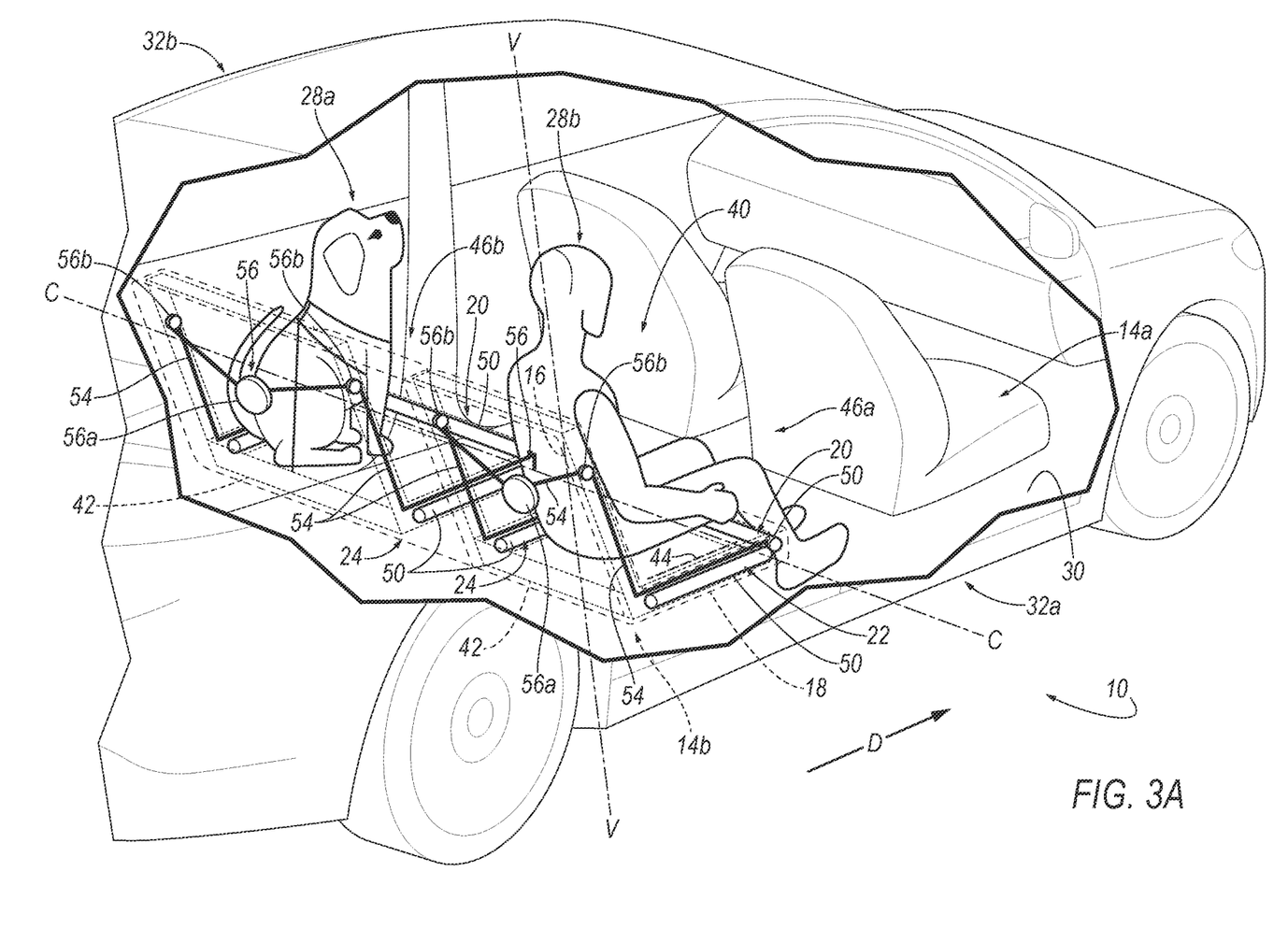
FIG. 3A is a perspective view of the vehicle with a first airbag assembly and a second airbag assembly with a human occupant and a non-human animal occupant.
Figure 3B:
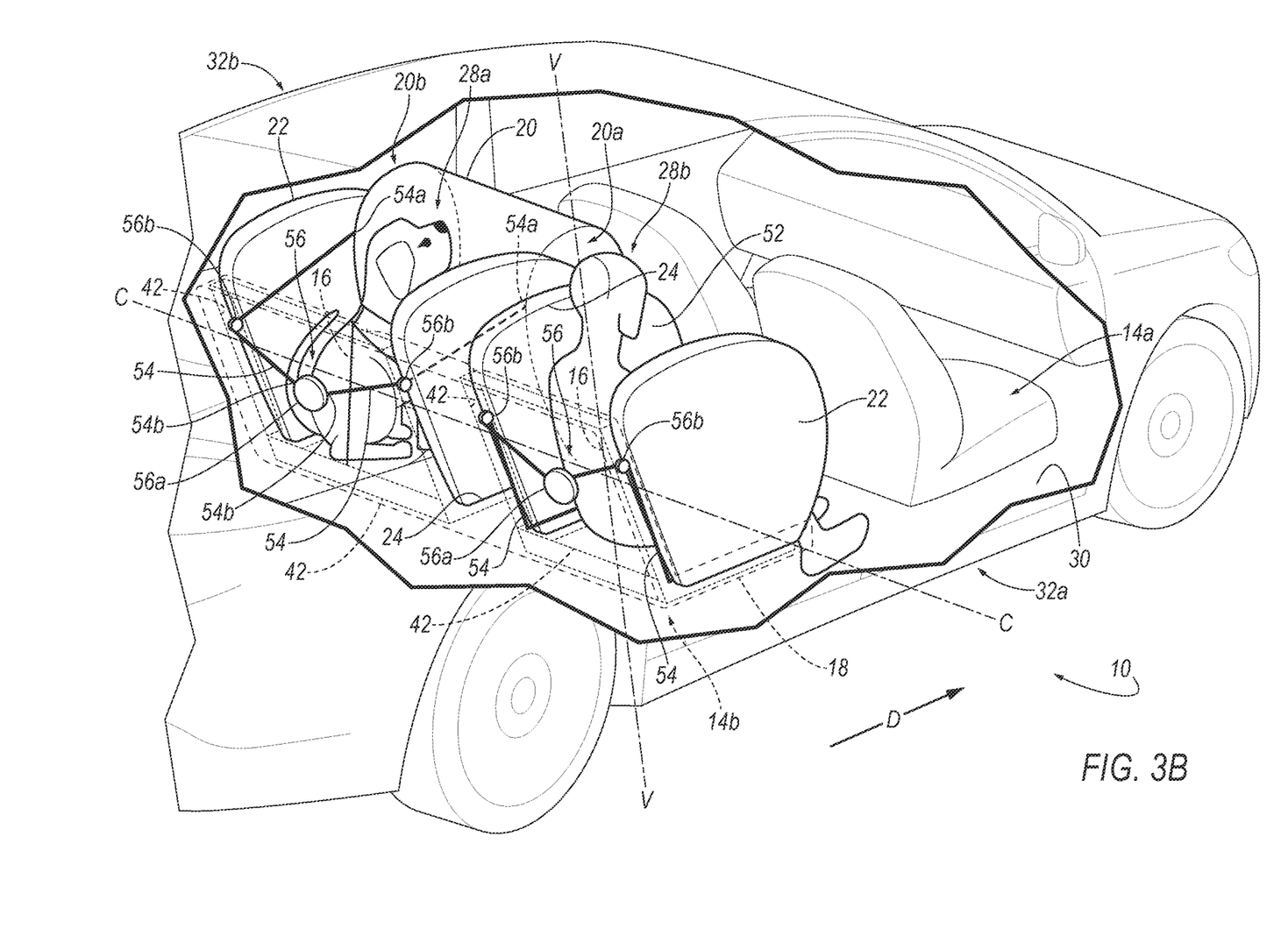
FIG. 3B is a perspective view of the vehicle with the first airbag assembly and the second airbag assembly in the inflated position with the human occupant and the non-human animal occupant.
Figure 4:
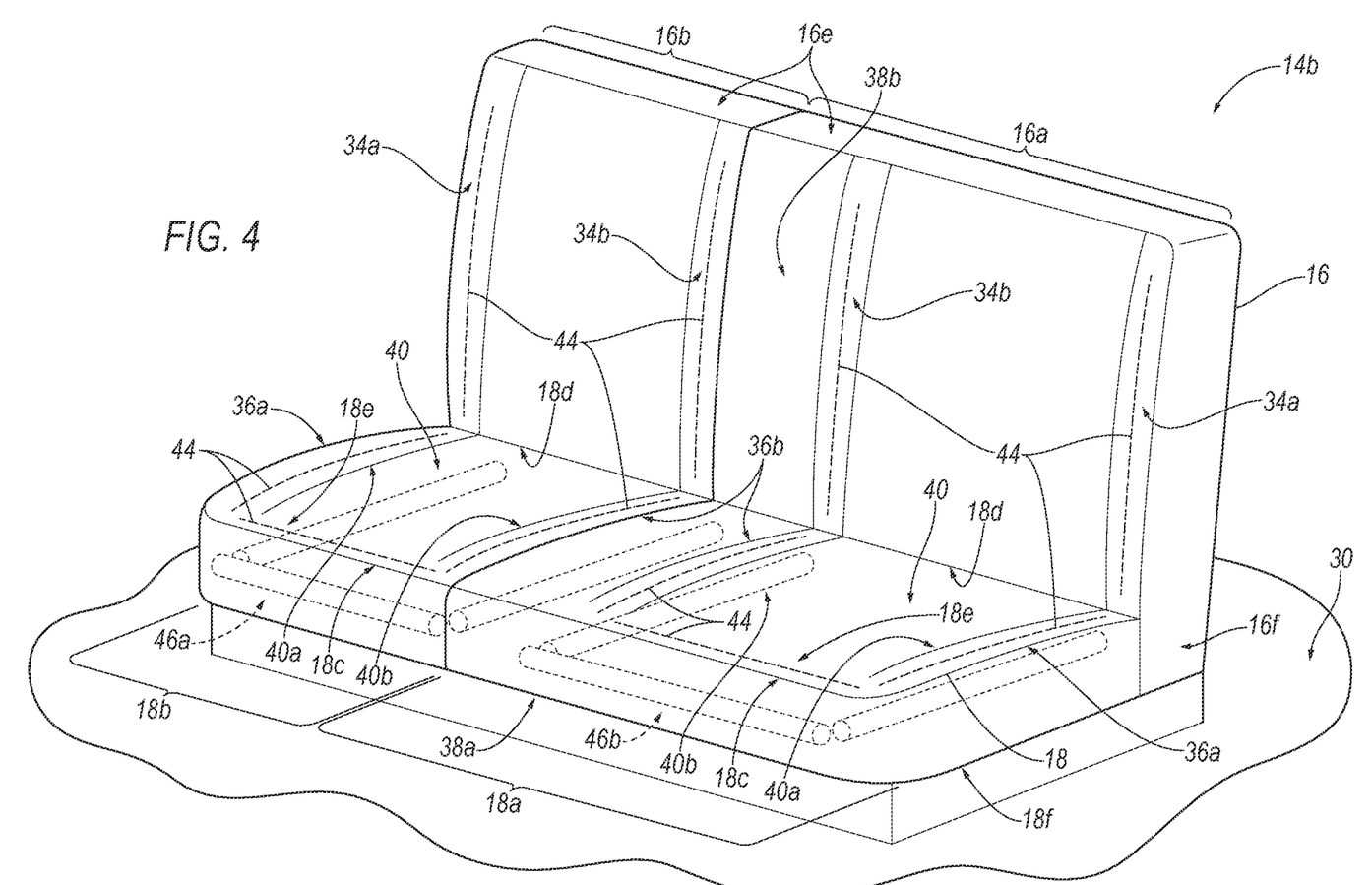
FIG. 4 is a perspective view of a rear seat including the first airbag assembly and the second airbag assembly.

In examples in which the airbag assembly 46 includes the housing 50, the housing 50 houses the front airbag 20, the first side airbag 22, and/or the second side airbag 24 in the uninflated position, as shown in FIGS. 1A, 2A, and 3A, and supports the airbag in the inflated position, as shown in FIGS. 1B, 2B, and 3B. The airbag may be rolled and/or folded to fit within the housing 50 in the uninflated position. The housing 50 may be of any suitable material, e.g., a rigid polymer, a metal, a composite, or a combination of rigid materials. The housing 50 may, for example, include clips, panels, etc. for attaching the airbag and for attaching the airbag assembly 46 to the seat 14. In other examples in which the airbag assembly 46 does not include a housing 50 the front airbag 20, the first side airbag 22, and the second side airbag 24 may be connected directly to the seat 14.

The front airbag 20, the first side airbag 22, and the second side airbag 24 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The front airbag 20, the first side airbag 22, and the second side airbag 24 may each be a single continuous unit, e.g., a single piece of fabric. Alternatively, the front airbag 20, the first side airbag 22, and the second side airbag 24 may each include a plurality of segments, i.e., two or more. The segments may be attached to each other in any suitable fashion, e.g., a plurality of panels 52 attached by stitching, ultrasonic welding, etc.

The front airbag 20, the first side airbag 22, and the second side airbag 24 are supported by the seat bottom 18 of the rear seat 14b. In the uninflated position, the front airbag 20, the first side airbag 22, and the second side airbag 24 may be disposed in the seat bottom 18, e.g., between the covering and the seat frame 42. In other words, the covering may cover the airbag in the uninflated position. The front airbag 20 is, for example, disposed at the front end 18c of the seat bottom 18. Specifically, the front airbag 20 includes a first end 20a and a second end 20b. The first end 20a of the front airbag 20 is disposed at the front end 18c of the seat bottom 18 adjacent the first side 40a of the occupant seating area 40. The second end 20b of the front airbag 20 is disposed at the front end 18c of the seat bottom 18 adjacent the second side 40b of the occupant seating area 40. The first side airbag 22 and the second side airbag 24 are, for example, each disposed on one side of the seat 14.

In the inflated position, the front airbag 20, the first side airbag 22, and the second side airbag 24 may each extend through the seat bottom 18, e.g., the tear seam 42 adjacent to the airbag. In this situation, the front airbag 20, the first side airbag 22, and the second side airbag 24 may each extend upwardly from the seat bottom 18, e.g., in a direction towards the roof of the vehicle 10. As an example, the front airbag 20, the first side airbag 22, and the second side airbag 24, in the inflated position, may each extend upwardly from the seat bottom 18 to the top 16e of the seatback 16. In the inflated position, the front airbag 20, the first side airbag 22, and the second side airbag 24 may each extend across the seating area to control kinematics of the occupant. As an example, in the inflated position, the front airbag 20 may be disposed at the front end 18c of the seat bottom 18. As another example, in the inflated position, the first side airbag 22 and the second side airbag 24 may be disposed on the first side 36a and the second side 36b of the seat bottom 18, respectively. As shown in the figures, in the inflated position, the first side airbag 22 abuts the first bolster 34a and the second side airbag 24 abuts the second bolster 34b.

The front airbag 20, the first side airbag 22, and the second side airbag 24, may each include a plurality of panels 52. In other words, in the examples shown in the Figures, the front airbag 20, the first side airbag 22, and the second side airbag 24 are not each single continuous units. The panels 52 are positioned to receive and be impacted by the occupant when the airbag is inflated during a vehicle impact.

As shown in the Figures, one of the panels 52 of the front airbag 20 faces the non-human animal occupant 28a in the inflated position. Specifically, the panel 52 may be disposed at the front end 18c of the seat bottom 18 and face toward the seatback 16 of the rear seat 14b. The panel 52 may be spaced from the seatback 16 of the rear seat 14b in the seat-forward direction. The panel 52 is positioned to receive and be impacted by the non-human animal occupant 28a when the front airbag 20 is inflated during a vehicle impact that urges the non-human animal occupant 28a toward the front airbag 20.

One of the panels 52 of the first side airbag 22 and one of the panels 52 of the second side airbag 24 faces the occupant, e.g., human and non-human animal occupant 28a, in the inflated position. Specifically, the panel 52 may be disposed at the first side 36a and/or the second side 36b of the seat bottom 18 and face toward the first side airbag 22 and/or the second side airbag 24. In other words, the panel 52 of the first side airbag 22 is disposed at the first side 36a of the seat bottom 18 and face toward the second side airbag 24 and the panel 52 of the second side airbag 24 is disposed at the second side 36b of the seat bottom 18 and face toward the first side airbag 22.

The panels 52 define an inflation chamber. During inflation, the inflation chamber may be inflated from the uninflated position to the inflated position. For example, the panels 52 may be in fluid communication with the inflator 48. In this situation, the panels 52 may be pushed upwardly away from the housing 50 by gas flow in the inflation chamber during inflation of the airbag. The front airbag 20, the first side airbag 22, and the second side airbag 24, i.e., the panels 52 and inflation chamber, may each be of any suitable size and shape.

The airbag may include a plurality of internal tethers (not shown) disposed in the inflation chamber. The internal tethers may extend across the inflation chamber, e.g., from the housing 50 to the panel 52. The internal tethers may be fixed, e.g., via stitching, ultrasonic welding, etc., to the housing 50 and the panel 52 in the inflation chamber. The airbag may include any suitable number of internal tethers. The internal tethers may be any suitable material. For example, the internal tethers may be a same material as the airbag. The internal tethers may be positioned to control the shape of the airbag.

The airbag assembly 46 may include a plurality of external tethers 54 extending from the front airbag 20 to the seatback 16. The external tethers 54 may be disposed between the first side airbag 22 and the second side airbag 24. The plurality of external tethers 54 may include a first external tether 54 and a second external tether 54. As shown in the Figures, the first external tether 54 is connected to the first end 20a of the front airbag 20 and the second external tether 54 is connected to the second end 20b of the front airbag 20. Specifically, the external tethers 54 are disposed adjacent the first side and the second side 40b of the occupant seating area 40. The airbag assembly 46 may include any suitable number of external tethers 54. The external tethers 54 may be any suitable material. For example, the external tethers 54 may be a same material as the airbag.

The external tethers 54 may be attached to the front airbag 20. Specifically, the external tethers 54 may have a first end 54a connected to the front airbag 20 and a second end 54b connected to the seatback 16. For example, the external tethers 54 may be attached to the front airbag 20 along an axis defined by the external tether 54 and extending from the seatback 16. As another example, an end of the external tethers 54 may be attached to the front airbag 20. The external tethers 54 may be attached to the front airbag 20, e.g., via stitching, ultrasonic welding, etc. As shown in the Figures, the external tethers 54 are disposed under the tear seam 42 of the seat bottom 18, i.e., under the covering. Specifically, the external tethers 54 are positioned under the tear seam(s) 42 in the inflated position. In such an example, the front airbag 20 may pull the external tethers 54 out of the seatback 16 and the seat bottom 18 during inflation of the front airbag 20. Specifically, as shown in the Figures, the external tethers 54 are disposed between the first side airbag 22 and the second side airbag 24.

The external tethers 54 may be attached to the seatback 16, e.g., the seat frame 42, as shown in FIGS. 1A, 2A, and 3A. Specifically, as described above, the second end 54*b* of the external tethers 54 may be connected to the seatback 16. The external tethers 54 may be attached to the seatback 16, e.g., via stitching, ultrasonic welding, etc. The external tethers 54 may be attached at any suitable location on the seatback 16. For example, the external tethers 54 may be attached to the seatback 16 between the top 16*e* and the 16*f*. Specifically, external tethers 54 may be attached to each side of the seatback 16.

The vehicle 10 may include a retractor assembly 56 and the external tethers 54 may be engaged with the retractor assembly 56, as shown in the Figures. Specifically, the retractor assembly 56 may be supported on the seatback 16 and the second end 54*b* of the external tether 54 is connected to the retractor assembly 56. The retractor assembly 56 may include a pyrotechnic actuator 56*a* to retract the external tether 54. For example, the pyrotechnic actuator 56*a* may be fixed to the seatback 16, e.g., the seat frame 42. In such an example, the second end 54*b* of the external tethers 54 may be engaged with the pyrotechnic actuator 56*a* and the first end 54*a* of the external tethers 54 may be attached to the front airbag 20. In this situation, the pyrotechnic actuator 56*a* may be actuated, e.g., simultaneously with the inflator 48, to retract the external tethers 54 during inflation of the front airbag 20, which pulls the external tethers 54 through the tear seam 42. The pyrotechnic actuator 56*a* may be any suitable type such as a piston linkage, in which an pyrotechnic charge drives a piston attached to a cable; a ball-in-tube linkage, in which an pyrotechnic charge propels a ball or balls over a cogwheel connected to a cable; a mechanical linkage, in which a compressed spring attached to a cable is released; a rotary pretensioner, in which a pyrotechnic charges rotates a shaft connected to a cable such that the cable wraps around the shaft, or any other suitable type.

In examples in which the external tethers 54 are engaged with the pyrotechnic actuator 56*a*, the seatback 16 may include a plurality of rollers 56*b*, as shown in FIGS. 1A-3B. Specifically, the retractor assembly 56 may include a plurality of rollers 56*b*. The plurality of rollers 56*b* may be attached to the seat frame 42. The supports may be disposed closer to the top 16*e* of the seatback 16 than the bottom 16*f* of the seatback 16. Each external tether 54 may be moveably engaged with one respective roller 56*b*. For example, the external tethers 54 may extend, i.e., be wrapped, partially around respective roller 56*b* when the airbag is in the uninflated position, as shown in FIGS. 1A, 2A, and 3A. The external tethers 54 may move relative to the rollers 56*b* during actuation of the pyrotechnic actuator 56*a*. Specifically, the external tethers 54 may be operatively engaged with the roller 56*b* when the pyrotechnic actuator 56*a* retracts the external tether 54. The external tethers 54 may, for example, contact the rollers 56*b* when the airbag is in the inflated position. The rollers 56*b* may, for example, be rotatable by the external tethers 54 during retraction of the external tethers 54. That is, the rollers 56*b* may be rotatable relative to the seatback 16. As another example, the rollers 56*b* may be fixed relative to the seatback 16. In such an example the rollers 56*b* may be any suitable low friction material and/or may be coated in any suitable low friction material.

The external tethers 54 may be uninflatable. In other words, the external tethers 54 may not define an inflation chamber, e.g., the external tethers 54 may be a panel of material that is not fixed to another panel, or itself, to enclose a volume for receiving inflation medium. The external tethers 54 may be a woven fabric, or any other suitable material.

The external tethers 54 may be under tension when airbag is inflated. In other words, the external tethers 54 may be taught, i.e., not relaxed, when the airbag is inflated. By tensioning the external tethers 54, the external tethers 54 may control the shape of the airbag during inflation. Additionally, the external tethers 54 may be a reaction surface for the airbag. That is, the external tethers 54 may provide a counteracting force against the airbag when the airbag is impacted by the pet. In such an example, the external tethers 54 may provide lateral support for the airbag, which may assist the airbag in controlling pet kinematics.

The inflator 48 is in fluid communication with the front airbag 20, the first side airbag 22, and/or the second side airbag 24. The vehicle 10 may include more than one inflator 48, e.g., a second inflator 48 in fluid communication with the first side airbag 22, a third inflator 48 in fluid communication with the second side airbag 24, etc. The inflator 48 may be in fluid communication with the front airbag 20, the first side airbag 22, and/or the second side airbag 24 via a manifold. As an example, when the occupant is a non-human animal occupant 28*a* the manifold may direct an inflation medium from the inflator 48 to the front airbag 20, the first side airbag 22, and the second side airbag 24. As another example, when the occupant is a human occupant 28*b*, the manifold may direct the inflation medium from the inflator 48 to the first side airbag 22 and the second side airbag 24 only. The manifold may be a component of the inflator 48 or may be between the inflator 48 and the airbags 20, 22, 24. The manifold may be controlled to select deliver of inflation medium (or not delivering inflation medium) from the inflator 48 to the airbags 20, 22, 24. The manifold may include mechanical features that control the passage and/or distribution of inflation medium and may be controlled by the controller 26. the manifold may receive instructions from the controller 26 with respect to whether the manifold is to direct inflation medium to the front airbag 20, the first side airbag 22, and the second side airbag 24, or to the first side airbag 22 and the second side airbag 24 only.

The inflator 48 expands the front airbag 20, the first side airbag 22, and the second side airbag 24 with the inflation medium, such as a gas, to move the airbag from the uninflated position to the inflated position. The inflator 48 may be supported by the seat bottom 18. The inflator 48 may be, for example, a pyrotechnic inflator 48 that ignites a chemical reaction to generate the inflation medium, a stored gas inflator 48 that releases (e.g., by a pyrotechnic valve) stored gas as the inflation medium, or a hybrid. The inflator 48 may be, for example, at least partially in the inflation chambers, to deliver inflation medium directly to the inflation chambers, or may be connected to the inflation chambers, through fill tubes, diffusers, etc.

Figure 5:
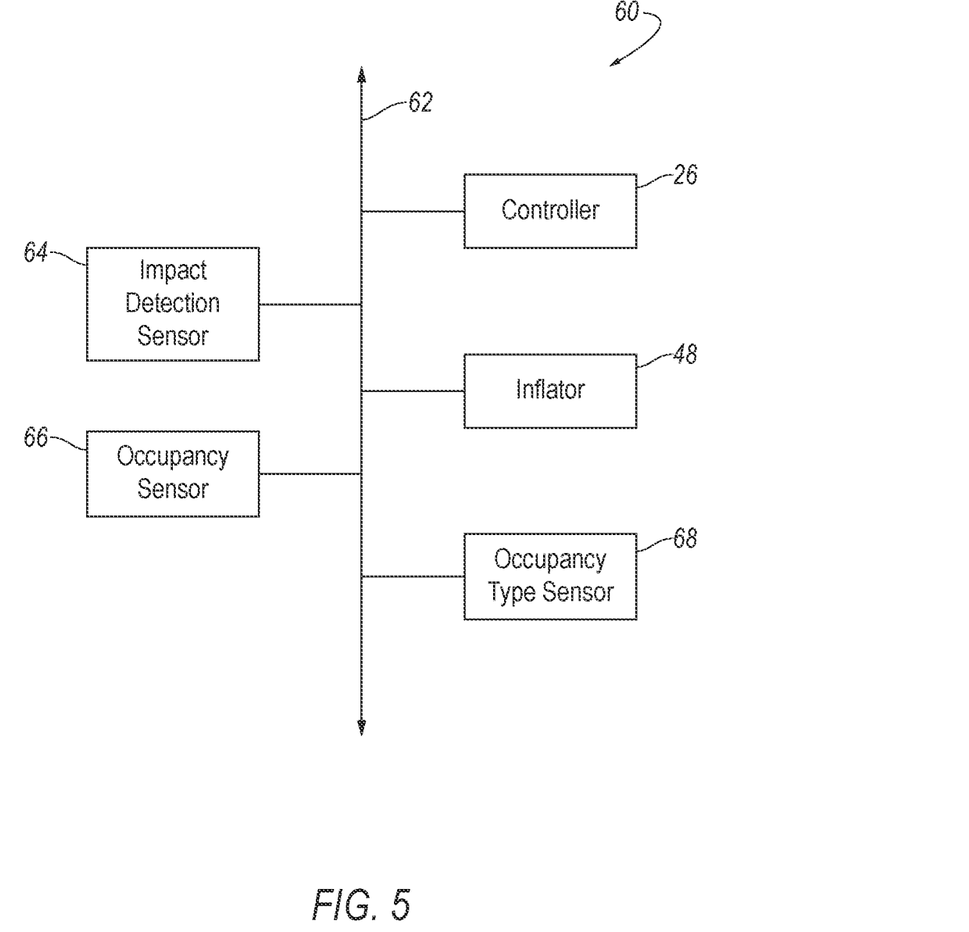
FIG. 5 is a block diagram of a vehicle communications network.

With reference to FIG. 5, the vehicle 10 includes a control system 60. The control system 60 includes a controller 26, at least one sensor for detecting an occupant and/or detecting the type of occupant (e.g., an occupancy sensor 66 and/or an occupancy-type sensor 68), and the airbag assembly 46 (e.g., the inflator 48) in communication through a communications network 62.

The impact detection sensor 64 may be in communication with the controller 26. The impact detection sensor 64 is programmed to detect an impact to the vehicle 10. The impact detection sensor 64 may be of any suitable type, for example, post-contact sensors such as accelerometers, pressure sensors, and contact switches; and pre-impact detection sensor 64s such as radar, lidar, and vision-sensing systems. The vision systems may include one or more cameras, CCD image sensors, CMOS image sensors, etc. The impact detection sensor 64 may be located at numerous points in or on the vehicle 10.

As set forth above, the control system 60 includes at least one sensor for detecting an occupant and/or detecting the type of occupant. In the example shown in the figures, the control system 60 includes the occupancy sensor 66 that detects the presence of an occupant in the seat 14 and an occupancy-type sensor 68 that detects the type of occupant. In other examples, a single occupant sensor may both detect the presence of an occupant in the seat and the type of occupant.

The occupancy sensor 66 may be configured to at least detect occupancy of the seat 14. The occupancy sensor 66 may be visible-light or infrared cameras directed at the seat 14, pressure sensors inside the seat 14, sensors detecting whether a seatbelt (not shown) for the seat 14 is buckled, or other suitable sensors. The occupancy sensor 66 is in communication with the controller 26 via the communications network 62.

The occupancy-type sensor 68 may be configured to detect whether the occupant of the seat 14 is a non-human animal occupant 28a or a human occupant 28b. As an example, shown in FIGS. 3A-3B, the occupancy-type sensor 68 may detect a human occupant 28b on the short portion 18b of the seat 14 and a non-human animal occupant 28a on the long portion 18a of the seat 14. The occupancy-type sensor 68 may be visible-light or infrared cameras directed at the seat 14, pressure sensors inside the seat 14, sensors detecting whether a seatbelt (not shown) for the seat 14 is buckled, a heartbeat monitor, or other suitable sensors. Based on detections and/or measurements taken by the occupancy-type sensor 68, the occupancy-type sensor 68 and/or the controller 26 is able to distinguish between a human occupant 28b and a non-human animal occupant 28a. The occupancy-type sensor 68 is in communication with the controller 26 via the communications network 62.

Figure 6:
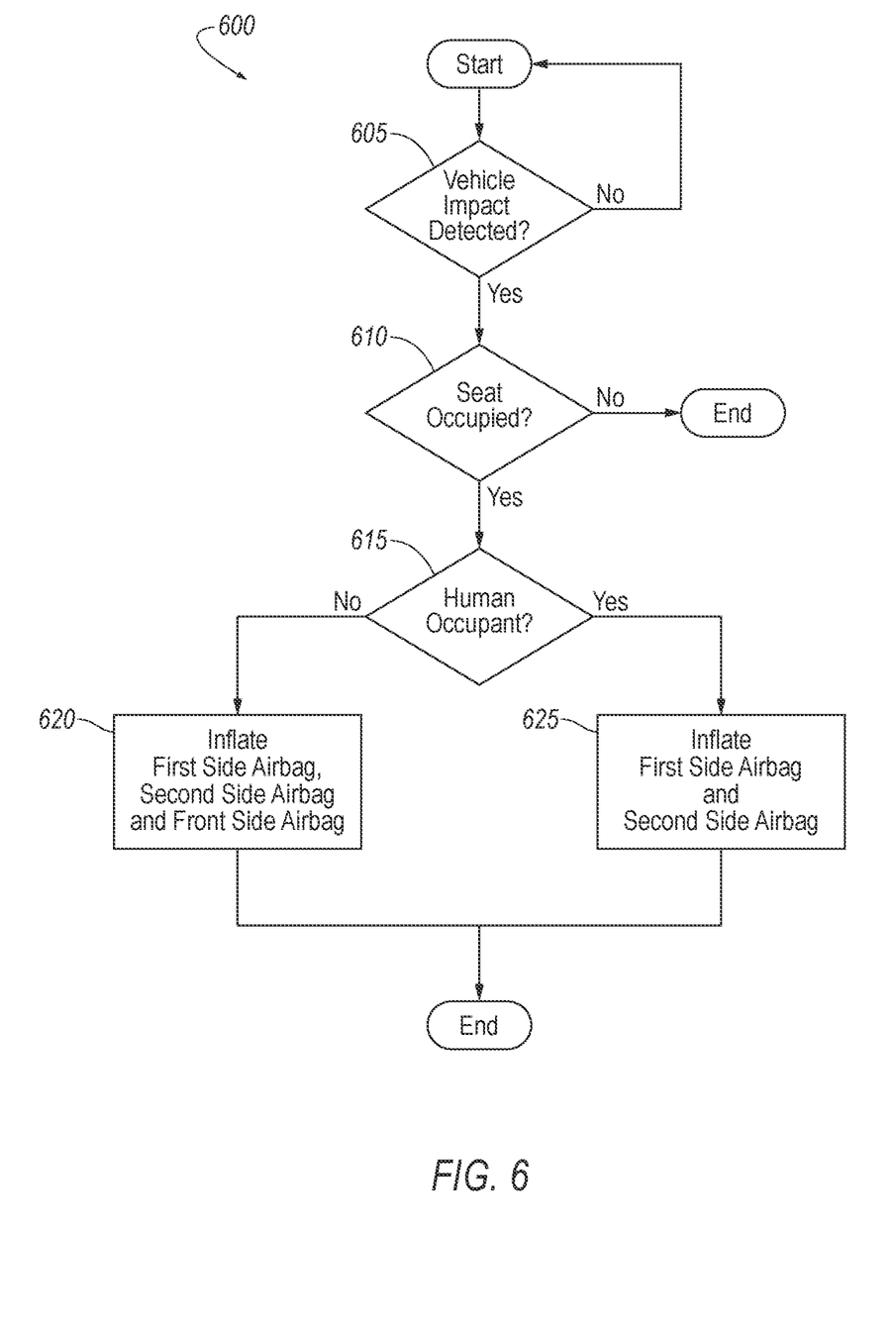
FIG. 6 is a block diagram of a method to deploy the airbag assembly.

The controller 26 may be a microprocessor-based computing device implemented via circuits, chips, or other electronic components. The controller 26 may include a processor, memory, etc. The memory of the controller 26 may store instructions executable by the processor and the processor may read the instructions from the memory and execute the instructions. Specifically, the memory stores instructions executable by the processor, i.e., the controller 26 is programmed to, perform the method 600 described below. The controller 26 may be, for example, a restraints control module. Use of "in response to," "based on," and "upon determining" with reference to the computer and the process 600 indicates a causal relationship, not merely a temporal relationship.

The control system 60 may transmit signals through the communications network 62 such as a controller 26 area network (CAN) bus, Ethernet, Local Interconnect Network (LIN), and/or by any other wired or wireless communications network.

The controller 26 is programmed to inflate the first side airbag 22 and the second side airbag 24 in response to detection of a vehicle impact, as described further below. The controller 26 is programmed to selectively inflate the front airbag 20 in response to detection of a vehicle impact. In other words, the controller 26 selects whether the front airbag 20 is inflated or not inflated based on other input. Specifically, the controller 26 is programmed to inflate the front airbag 20, along with the first side airbag 22 and the second airbag, in response to detection of a vehicle impact and detection of a non-human animal occupant 28a on the seat 14 and the controller 26 is programmed to inflate first side airbag 22 and the second side airbag 24 without inflating the front airbag 20, i.e., the front airbag 20 is not inflated.

Specifically, the controller 26 is programmed to selectively initiate inflation of the front airbag 20, the first side airbag 22, and the second side airbag 24 in response to a detection of a pet in the seat 14 and detection of a sensed vehicle impact. For example, the controller 26 receives an input from the occupancy-type sensor 68 including information about the type of occupant, e.g., a non-human animal occupant 28a or a human occupant 28b and bases the selective inflation of the front airbag 20 (i.e., to inflate or not inflate) based on the type of occupant. The occupancy-type sensor 68 may indicate to the controller 26 the type of occupant and/or the controller 26 may process the input to determine whether a non-human animal occupant 28a or a human occupant 28b is seated in the seat.

As one example, the controller 26 can receive an image of the seat 14 from the occupancy-type sensor 68. The controller 26 can determine a non-human animal occupant 28a is in the seat 14, as shown in FIGS. 1B and 2B, by using image processing techniques. The controller 26 can then initiate inflation of the front airbag 20, the first side airbag 22, and the second side airbag 24 in response to detecting a vehicle impact and the determination of the type of occupant. As an example, the controller 26 instructs the manifold and/or the inflator 48 to direct inflation medium from the inflator 48 into the front airbag 20, the first side airbag 22, and the second side airbag 24.

As another example, the controller 26 can receive the body temperature of the occupant in the seat 14 from the occupancy-type sensor 68. The controller 26 can determine whether a non-human animal occupant 28a or human occupant 28b is seated in the seat 14. The controller 26 may compare the temperature of the occupant with known temperatures for a human occupant 28b and various non-human animal occupants 28a.

As another example, the controller 26 can receive the heart rate of the occupant in the seat from the occupancy-type sensor 68. The controller 26 can determine whether a non-human animal occupant 28a or human occupant 28b is seated in the seat 14. The controller 26 may compare the heart rate of the occupant with known heart rates for a human occupant 28b and various non-human animal occupants 28a.

In response to detecting a non-human animal occupant 28a is seated in the seat 14 and detecting vehicle impact from the impact detection sensor 64, the controller 26 may initiate inflation of the front airbag 20, the first side airbag 22, and the second side airbag 24. In other words, in examples in which the impact detection sensor 64 detects a vehicle impact, the controller 26 may send a signal to actuate the inflator 48. In this situation, the inflator 48 discharges inflation medium, which inflates the front airbag 20, the first side airbag 22, and the second side airbag 24, as shown in FIG. 2B.

The controller 26 may be programmed to inflate the first side airbag 22 and the second side airbag 24 in response to detection of the occupant in the seat 14 being a human occupant 28b. Specifically, the controller 26 may be programmed to selectively initiate inflation of the first side airbag 22 and the second side airbag 24 and not initiate inflation of the front airbag 20 in response to a detection of a human occupant 28b in the seat 14. In response to inputs from the occupancy-type sensor 68, the controller 26 can determine a human occupant 28b is in the seat 14, as shown in FIGS. 1A and 2A. The controller 26 can then initiate inflation of the first side airbag 22 and the second side airbag 24 in response to detecting a vehicle impact. For example, in response to receiving signals from the impact detection sensor 64, the controller 26 may initiate inflation of the first side airbag 22 and the second side airbag 24. In other words, in examples in which the impact detection sensor 64 detects a vehicle impact, the controller 26 may send a signal to actuate the inflator 48. In this situation, the inflator 48 discharges inflation medium, which inflates the first side airbag 22 and the second side airbag 24. In such a situation, the front airbag 20 is not inflated from the uninflated position to the inflated position during the vehicle impact, as shown in FIG. 2A. In this example, the controller 26 instructs the manifold and/or the inflator 48 to direct inflation medium from the inflator 48 into only the first side airbag 22 and the second side airbag 24.

As an example shown in FIGS. 3A-3B, a non-human animal occupant 28a and a human occupant 28b are on the rear seat 14b. The controller 26 may be programmed to inflate the first airbag assembly 46a or the second airbag assembly 46b in response to a detected vehicle impact and detected occupancy of a non-human animal occupant 28a on the first section or the section. Alternatively, the controller 26 may be programmed to inflate the first airbag assembly 46a or the second airbag assembly 46b in response to a detected vehicle impact and detected occupancy of a human occupant 28b on the first section or the section. The controller 26 is programmed to inflate the first airbag assembly 46a and the second airbag assembly 46b independently, i.e., the first airbag assembly 46a or the second airbag assembly 46b may be inflated, or the first airbag assembly 46a and the second airbag assembly 46b may be inflated.

In the example shown in FIG. 3B, the non-human animal occupant 28a is on the long portion 18a and the human occupant 28b is on the short portion 18b. In such an example, the controller 26 determines the non-human animal occupant 28a is on the long portion 18a and the human occupant 28b is on the short portion 18b. In response to a detected vehicle impact, the controller 26 initiates inflation of the front airbag 20, the first side airbag 22, and the second side airbag 24 on the long portion 18a of the rear seat 14b and initiates inflation of the first side airbag 22 and the second side airbag 24 on the short portion 18b of the rear seat 14b. In another example, where the non-human animal occupant 28a is not restrained on the seat 14, i.e., able to move freely between the short portion 18b and the long portion 18a, the non-human animal occupant 28a may sit on, e.g., the lap, of the human occupant 28b. In such an example, the controller 26 determines the non-human animal occupant 28a and the human occupant 28b are on the same section of the rear seat 14b. In response to a detected vehicle impact, the controller 26 initiates inflation of the first side airbag 22 and the second side airbag 24.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag is in the uninflated position, under normal operating conditions of the vehicle 10. In the event of a vehicle impact, the controller 26 performs the method 600 shown in FIG. 6.

With reference to block 605, the method 600 includes detecting vehicle impact. For example, as described above, the impact detection sensors 64 detect a vehicle impact. In the event of a vehicle impact, based on input from the impact detection sensors 64, the controller 26 determines that the vehicle impact has occurred If a vehicle impact is detected, the process moves to block 610.

With reference to block 610, the method 600 includes detecting whether an occupant is present in the seat 14. If no occupant is detected, the method 600 ends. If an occupant is detected on the seat 14, the method 600 moves to block 615. Specifically, the method 600 may include detecting the presence of the occupant with the occupancy sensor 66, as described above. With reference to block 615, the method 600 includes detecting the type of occupant. Specifically, the method 600 includes determining whether the occupant is a human occupant 28b or a non-human animal occupant 28a. For example, the method 600 may include determining the type of occupant with the occupant-type sensor 68, as described above. If a non-human animal occupant 28a is detected, the method 600 moves to block 620. If a human occupant 28b is detected, the method 600 moves to block 625. Blocks 610 and 615 are shown as separate blocks in FIG. 6 by way of examples and the steps in blocks 610 and 615 may be performed simultaneously. The order of blocks 605-615 is shown in FIG. 6 by way of example and blocks 605-615 may occur in any suitable order or simultaneously.

With reference to block 620, the method 600 includes inflating the front airbag 20, the first side airbag 22, and the second side airbag 24 in response to detection of vehicle impact and determination that the occupant is a non-human animal occupant. For example, the method 600 may include instructing the inflator 48 to inflate the front airbag 20, the first side airbag 22, and the second side airbag 24. Specifically, the controller 26 may instruct the manifold and/or the inflator 48 to direct inflation medium into the front airbag 20, the first side airbag 22, and the second side airbag 24.

With reference to block 625, the method 600 includes inflating the first side airbag 22 and the second side airbag 24 without inflating the front airbag 20 in response to detection of vehicle impact and determination that the occupant is a non-human animal occupant. For example, the method 600 may include instructing the inflator 48 to inflate the first side airbag 22 and the second side airbag 24. As an example, the controller 26 may instruct the manifold to direct inflation medium to the first side airbag 22 and the second side airbag 24 only.

As described above, when a pet is detected in the seat 14 and the vehicle impact is detected, the controller 26 transmits a signal through the communication network triggering the inflator 48 to inflate the front airbag 20, the first side airbag 22, and the second side airbag 24 with inflation medium from the uninflated position to the inflated position. When the inflator 48 inflates the front airbag 20, the first side airbag 22, and the second side airbag 24 to the inflated position, the inflation medium flows into the airbag increasing the pressure in the front airbag 20, the first side airbag 22, and the second side airbag 24. As the pressure is increased in the front airbag 20, the first side airbag 22, and the second side airbag 24, the front airbag 20, the first side airbag 22, and the second side airbag 24 inflate upwardly from the seat bottom 18. As the pet moves relative to the seat 14 due to momentum of the vehicle impact, the pet moves towards the front airbag 20, the first side airbag 22, and the second side airbag 24. When the pet impacts the front airbag 20, the first side airbag 22, and the second side airbag 24, the front airbag 20, the first side airbag 22, and the second side airbag 24 control the kinematics of the pet. By having the first side airbag 22 and the second side airbag 24 extend along the seating area from the front end 18c of the seat bottom 18 to the seatback 16, the airbag assembly 46 can control the kinematics of the pet regardless of a direction of the vehicle impact. By detecting whether a human or non-human animal occupant 28a is seated on the seat 14, and selectively inflating the front airbag 20, the first side airbag 22, and the second side airbag 24 in response to either a human or non-human animal occupant 28a is seated on the seat 14, the airbag assembly 46 can control the kinematics of a human or a non-human animal occupant 28a.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

The invention claimed is:

1. An assembly comprising:
a seat having a seatback and a seat bottom, the seat bottom having a front end spaced from the seatback;
a front airbag elongated along the front end of the seat bottom;
a first side airbag elongated in a direction from the seatback to the front end;
a second side airbag elongated in a direction from the seatback to the front end, the second side airbag being spaced cross-seat from the first side airbag; and
a controller programmed to:
inflate the first side airbag and the second side airbag in response to at least detection of a vehicle impact; and
selectively inflate the front airbag in response to at least detection of the vehicle impact and detection of a non-human animal occupant on the seat.

2. The assembly of claim 1, wherein the controller is programmed to inflate the first side airbag and the second side airbag in response to the occupant being a human occupant.

3. The assembly of claim 1, wherein the seatback includes a top, the front airbag in the inflated position extending upwardly from the seat bottom to the top of the seatback.

4. The assembly of claim 1, wherein the seat includes a first bolster and a second bolster, the first side airbag abutting the first bolster in the inflated position and the second side airbag abutting the second bolster in the inflated position.

5. The assembly of claim 1, further comprising a tether having a first end connected to the front airbag and a second end connected to the seatback.

6. The assembly of claim 5, further comprising a retractor assembly supported on the seatback, the second end connected to the retractor assembly.

7. The assembly of claim 6, wherein the retractor assembly includes a guide roller supported on the seatback and a pyrotechnic actuator supported on the seatback.

8. The assembly of claim 7, wherein the guide roller is operatively engaged with the first tether when the pyrotechnic actuator retracts the first tether.

9. The assembly of claim 5, where in the seat bottom includes a tear seam, the tether being positioned under the tear seam in the uninflated position.

10. The assembly of claim 1, where the seat includes a first tether, an occupant seating area having a first side and a second side, the first tether being disposed adjacent the first side or the second side.

11. The assembly of claim 1, wherein the front airbag includes a first end and a second end, a tether assembly including a first tether and a second tether, the first tether being connected to the first end and the second tether being connected to the second end.

12. The assembly of claim 1, further comprising an occupant type sensor, the occupant type sensor detecting whether the occupant of the seat is a non-human animal occupant or a human occupant.

13. An assembly for a vehicle comprising:
a seat having a seat bottom, the seat bottom having a first section and a second section;
a first airbag assembly supported on the first section of the seat bottom and a second airbag assembly supported on the second section of the seat bottom, the first airbag assembly and the second airbag assembly inflatable to an inflated position; and
a controller programmed to inflate the first airbag assembly or the second airbag assembly in response to a detected vehicle impact and detected occupancy of a non-human animal occupant on the first section or the second section.

14. The assembly of claim 13, wherein the first airbag assembly and the second airbag assembly inflate upwardly from the seat bottom to the inflated position.

15. The assembly of claim 13, wherein the controller is programmed to inflate the first airbag assembly and the second airbag assembly independently.

16. The assembly of claim 13, wherein the first section is about 60% of the seat bottom and the second section is about 40% of the seat bottom.

17. The assembly of claim 13, wherein the first airbag assembly and the second airbag assembly each include a front airbag, a first side airbag, and a second side airbag.

18. The assembly of claim 17, wherein the controller is programmed to inflate the first side airbag and the second side airbag in response to at least detection of a vehicle impact; and selectively inflate the front airbag in response to at least detection of the vehicle impact and detection of a non-human animal occupant on the seat.

19. The assembly of claim 13, further comprising an occupant type sensor, the occupant type sensor detecting whether the occupant of the seat is a non-human animal occupant or a human occupant.

\* \* \* \* \*